United States Patent
Zhang

(10) Patent No.: US 10,506,431 B2
(45) Date of Patent: Dec. 10, 2019

(54) AUTHENTICATION METHOD, MOBILE COMMUNICATIONS AUTHENTICATION PLATFORM, AND DEVICE

(71) Applicant: Huawei Technologies Co., Ltd., Shenzhen (CN)

(72) Inventor: Jun Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 226 days.

(21) Appl. No.: 15/472,729

(22) Filed: Mar. 29, 2017

(65) Prior Publication Data

US 2017/0201885 A1    Jul. 13, 2017

Related U.S. Application Data

(63) Continuation of application No. PCT/CN2015/079347, filed on May 20, 2015.

(30) Foreign Application Priority Data

Sep. 30, 2014 (CN) .......................... 2014 1 0526279

(51) Int. Cl.
*H04W 12/06* (2009.01)
*G07C 9/00* (2006.01)

(52) U.S. Cl.
CPC ........ *H04W 12/06* (2013.01); *G07C 9/00031* (2013.01); *G07C 9/00103* (2013.01); *G07C 9/00571* (2013.01)

(58) Field of Classification Search
CPC ............... H04W 12/06; G07C 9/00031; G07C 9/00103; G07C 9/00571
See application file for complete search history.

(56) References Cited

U.S. PATENT DOCUMENTS

6,496,979 B1 * 12/2002 Chen .................. G06F 8/61
                                        717/178
7,542,455 B2 * 6/2009 Grayson ............... H04W 76/10
                                        370/338

(Continued)

FOREIGN PATENT DOCUMENTS

CN         102802156 A     11/2012
CN         102883404 A      1/2013
(Continued)

OTHER PUBLICATIONS

Iso et al., Ubiquitous discovery service platform for mobile applications via a cell phone, Oct. 2003, Joint 1st Workshop on Mobile Future and Symposium on Trends in Communications, pp. 5-8 (Year: 2003).*

*Primary Examiner* — Kenneth W Chang
(74) *Attorney, Agent, or Firm* — Slater Matsil, LLP

(57) ABSTRACT

Embodiments disclose an authentication method, a mobile communications authentication platform, and a device. The method of the embodiments of the present invention includes: receiving, by a mobile communications authentication platform, first identifier information of a first device and second identifier information of a second device. The method also includes searching, by the mobile communications authentication platform, a correspondence between identifier information of devices on the mobile communications authentication platform according to the first identifier information and the second identifier information, determining whether the first identifier information is corresponding to the second identifier information, and feeding back a determining result to the first device.

21 Claims, 5 Drawing Sheets

(56) References Cited

U.S. PATENT DOCUMENTS

| | | | | |
|---|---|---|---|---|
| 2004/0105428 | A1* | 6/2004 | Hukkanen | H04W 76/10 370/352 |
| 2005/0215233 | A1* | 9/2005 | Perera | H04W 12/06 455/411 |
| 2005/0259620 | A1* | 11/2005 | Igarashi | H04L 41/00 370/331 |
| 2008/0235768 | A1* | 9/2008 | Walter | H04L 63/08 726/3 |
| 2009/0300365 | A1* | 12/2009 | Karmes | G06F 21/125 713/182 |
| 2010/0075655 | A1 | 3/2010 | Howarter et al. | |
| 2011/0185354 | A1* | 7/2011 | Tanner | G06F 8/61 717/178 |
| 2012/0142367 | A1* | 6/2012 | Przybylski | H04W 4/046 455/456.1 |
| 2012/0309352 | A1* | 12/2012 | Fang | H04L 63/08 455/411 |
| 2013/0198510 | A1* | 8/2013 | Rahman | H04L 9/321 713/155 |
| 2013/0297100 | A1 | 11/2013 | Petersen et al. | |
| 2014/0270172 | A1* | 9/2014 | Peirce | H04L 9/0819 380/270 |
| 2015/0024688 | A1* | 1/2015 | Hrabak | H04W 4/80 455/41.2 |
| 2015/0116081 | A1* | 4/2015 | Nair | B60R 25/04 340/5.61 |

FOREIGN PATENT DOCUMENTS

| | | |
|---|---|---|
| CN | 102984689 A | 3/2013 |
| CN | 103035054 A | 4/2013 |
| CN | 103310518 A | 9/2013 |
| CN | 104301893 A | 1/2015 |
| EP | 2763444 A1 | 8/2014 |
| WO | 2010144490 A1 | 12/2010 |
| WO | 2014146186 A1 | 9/2014 |

* cited by examiner

AUTHENTICATION METHOD, MOBILE COMMUNICATIONS AUTHENTICATION PLATFORM, AND DEVICE

CROSS-REFERENCE TO RELATED APPLICATIONS

This application is a continuation of International Application No. PCT/CN2015/079347, filed on May 20, 2015, which claims priority to Chinese Patent Application No. 201410526279.7, filed on Sep. 30, 2014. The disclosures of the aforementioned applications are hereby incorporated by reference in their entireties.

TECHNICAL FIELD

The present invention relates to the field of communications technologies, and in particular, to an authentication method, a mobile communications authentication platform, and a device.

BACKGROUND

There are many identity authentication scenarios in real life, for example, opening a door, signing for received goods, card payment, and obtaining permission to perform an operation. Although objectives of services initiating identity authentication in these scenarios are different, requirements for identity authentication effects are similar, for example, simple and efficient, and secure and reliable.

To achieve these effects, control points in an identity authentication process are generated, including: a network architecture, a network element device, a software algorithm, information management, a process, a regulation, role assignment, and the like. Even a simple identity authentication case like signing for received goods relates to multiple network elements, such as a buyer, a seller, a freighter, a courier, a consignee, an order, and physical goods. In the identity authentication process, there are various means of identity authentication used in these different application scenarios, such as a key, a password, a fingerprint, voice, an iris, a radio frequency access card, a signature, a seal, an identity card, cash, a bank card, and a cell phone.

In the foregoing different authentication scenarios, authentication rules, infrastructures, and participants are different. This causes much inconvenience to all parties participating in authentication, and system reconstruction. This is inefficient and cost-ineffective.

SUMMARY

Embodiments of the present invention provide an authentication method, a mobile communications authentication platform, and a device. They can meet authentication requirements in various different scenarios, and are highly universal, cost-effective, and simple and secure.

A first aspect of the embodiments of the present invention provides an authentication method. The method includes receiving, by a mobile communications authentication platform, first identifier information of a first device and second identifier information of a second device. The method also includes searching, by the mobile communications authentication platform, a correspondence between identifier information of devices on the mobile communications authentication platform according to the first identifier information and the second identifier information, determining whether the first identifier information is corresponding to the second identifier information, and feeding back a determining result to the first device.

With reference to the first aspect of the embodiments of the present invention, in a first implementation manner of the first aspect of the embodiments of the present invention, before the searching, by the mobile communications authentication platform, a correspondence between identifier information of devices on the mobile communications authentication platform according to the first identifier information and the second identifier information, and determining whether the first identifier information is corresponding to the second identifier information, the method further includes: obtaining, by the mobile communications authentication platform, the correspondence between identifier information of devices.

With reference to the first aspect or the first implementation manner of the first aspect of the embodiments of the present invention, in a second implementation manner of the first aspect of the embodiments of the present invention, the first identifier information and the second identifier information that are received by the mobile communications authentication platform are sent by the first device.

With reference to the first aspect or the first implementation manner of the first aspect of the embodiments of the present invention, in a third implementation manner of the first aspect of the embodiments of the present invention, the first identifier information received by the mobile communications authentication platform is sent by the first device, and the second identifier information received by the mobile communications authentication platform is sent by the second device.

With reference to the first aspect or the first implementation manner of the first aspect or the second implementation manner of the first aspect or the third implementation manner of the first aspect of the embodiments of the present invention, in a fourth implementation manner of the first aspect of the embodiments of the present invention, before the searching, by the mobile communications authentication platform, a correspondence between identifier information of devices on the mobile communications authentication platform according to the first identifier information and the second identifier information, and determining whether the first identifier information is corresponding to the second identifier information, the method further includes: receiving, by the mobile communications authentication platform, authentication application information that is of the first device and sent by the first device; and determining, by the mobile communications authentication platform, an authentication qualification of the first device according to the authentication application information of the first device.

With reference to the fourth implementation manner of the first aspect of the embodiments of the present invention, in a fifth implementation manner of the first aspect of the embodiments of the present invention, the determining, by the mobile communications authentication platform, an authentication qualification of the first device according to the authentication application information of the first device includes: determining, by the mobile communications authentication platform according to the authentication application information, that an authentication application of the first device is a valid application.

A second aspect of the embodiments of the present invention provides an authentication method. The method includes sending, by a first device, an authentication request to a mobile communications authentication platform, where the authentication request includes first identifier information of the first device and second identifier information of a second device, and the first device receives a determining result fed back by the mobile communications authentication platform, where the determining result is obtained after the mobile communications authentication platform searches for a correspondence between identifier information of devices on the mobile communications authentication platform according to the first identifier information and the second identifier information, and determines whether the first identifier information is corresponding to the second identifier information; or the authentication request includes first identifier information of the first device, and the first device receives a determining result fed back by the mobile communications authentication platform, where the determining result is obtained after the mobile communications authentication platform searches for a correspondence between identifier information of devices on the mobile communications authentication platform according to the first identifier information and received second identifier information of a second device, and determines whether the first identifier information is corresponding to the second identifier information.

With reference to the second aspect of the embodiments of the present invention, in a first implementation manner of the second aspect of the embodiments of the present invention, the method further includes: sending, by the first device, authentication application information of the first device to the mobile communications authentication platform, so that the mobile communications authentication platform determines an authentication qualification of the first device.

A third aspect of the embodiments of the present invention provides a mobile communications authentication platform. The platform includes a receiving unit, configured to receive first identifier information of a first device and second identifier information of a second device. The platform also includes a processing unit, configured to search for a correspondence between identifier information of devices on the mobile communications authentication platform according to the first identifier information and the second identifier information, determine whether the first identifier information is corresponding to the second identifier information, and feed back a determining result to the first device.

With reference to the third aspect of the embodiments of the present invention, in a first implementation manner of the third aspect of the embodiments of the present invention, the processing unit is further configured to obtain the correspondence between identifier information of devices before the authentication unit searches for the correspondence between identifier information of devices on the mobile communications authentication platform according to the first identifier information and the second identifier information, and determines whether the first identifier information is corresponding to the second identifier information.

With reference to the third aspect or the first implementation manner of the third aspect of the embodiments of the present invention, in a second implementation manner of the third aspect of the embodiments of the present invention, the first identifier information and the second identifier information that are received by the receiving unit are sent by the first device.

With reference to the third aspect or the first implementation manner of the third aspect of the embodiments of the present invention, in a third implementation manner of the third aspect of the embodiments of the present invention, the first identifier information received by the receiving unit is sent by the first device, and the second identifier information received by the receiving unit is sent by the second device.

With reference to the third aspect or the first implementation manner of the third aspect or the second implementation manner of the third aspect or the third implementation manner of the third aspect of the embodiments of the present invention, in a fourth implementation manner of the third aspect of the present invention, the receiving unit is further configured to receive authentication application information that is of the first device and sent by the first device; and the processing unit is further configured to determine an authentication qualification of the first device according to the authentication application information of the first device.

With reference to the fourth implementation manner of the third aspect of the embodiments of the present invention, in a fifth implementation manner of the third aspect of the embodiments of the present invention, the processing unit is specifically configured to determine, according to the authentication application information, that an authentication application of the first device is a valid application; and the receiving unit may be a receiver, and the processing unit may be a processor.

A fourth aspect of the embodiments of the present invention provides a device. The device includes a sending unit, configured to send an authentication request to a mobile communications authentication platform. The device also includes a receiving unit, configured to: when the authentication request includes first identifier information of the device and second identifier information of a target device, receive a determining result fed back by the mobile communications authentication platform, where the determining result is obtained after the mobile communications authentication platform searches for a correspondence between identifier information of devices on the mobile communications authentication platform according to the first identifier information and the second identifier information, and determines whether the first identifier information is corresponding to the second identifier information. The receiving unit is further configured to: when the authentication request includes first identifier information of the first device, receive a determining result fed back by the mobile communications authentication platform, where the determining result is obtained after the mobile communications authentication platform searches for a correspondence between identifier information of devices on the mobile communications authentication platform according to the first identifier information and received second identifier information of a target device, and determines whether the first identifier information is corresponding to the second identifier information.

With reference to the fourth aspect of the embodiments of the present invention, in a first implementation manner of the fourth aspect of the embodiments of the present invention, the sending unit is further configured to send authentication application information of the first device to the mobile communications authentication platform, so that the mobile communications authentication platform determines an authentication qualification of the first device; and the receiving unit may be a receiver, and the sending unit may be a transmitter.

It can be learned from the foregoing technical solutions that the embodiments of the present invention have the following advantages.

A mobile communications authentication platform may determine, according to first identifier information of a first device and second identifier information of a second device, and a correspondence between identifier information of devices on the mobile communications authentication platform, whether the first identifier information is corresponding to the second identifier information, and feeds back a determining result to the first device. The embodiments of the present invention can meet authentication requirements in various different scenarios, and are highly universal, cost-effective, and simple and secure.

DETAILED DESCRIPTION OF ILLUSTRATIVE EMBODIMENTS

Embodiments of the present invention provide an authentication method, a mobile communications authentication platform, and a device; they can meet authentication requirements in various different scenarios, and are highly universal, cost-effective, and simple and secure.

To make persons skilled in the art understand the technical solutions in the present invention better, the following clearly describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

Figure 1:
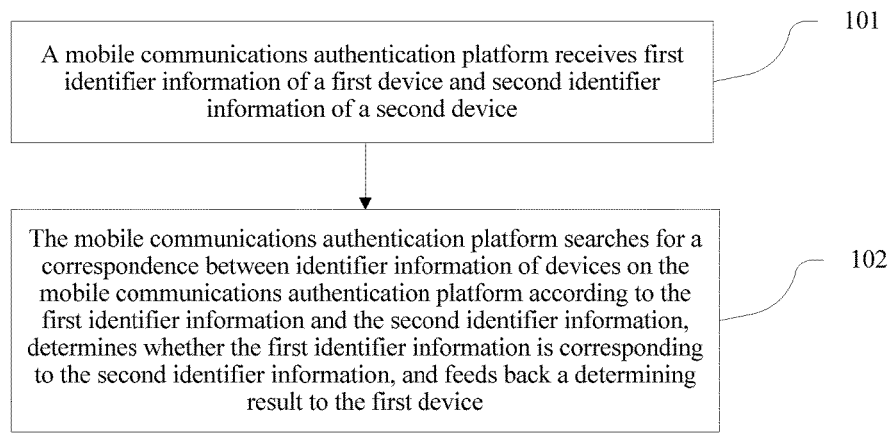
FIG. 1 is a schematic diagram of an embodiment of an authentication method according to an embodiment of the present invention.

Referring to FIG. 1, an embodiment of an authentication method in the embodiments of the present invention includes the following steps.

101. A mobile communications authentication platform receives first identifier information of a first device and second identifier information of a second device.

Through long-term development and evolution and large-scale commercialization, an extremely mature authentication technology has emerged in the mobile communications industry. The technology includes control points, such as a network architecture, a network element device, a software algorithm, information management, a process, a regulation, and role assignment. Provided that an identity authentication capability of the mobile communications authentication platform is opened up, any third-party device can use the identity authentication capability of the mobile communications authentication platform to perform authentication.

In this embodiment, the mobile communications authentication platform is a mobile communications authentication platform whose identity authentication capability is opened up. A device in which an authentication application is installed can use the identity authentication capability of the mobile communications authentication platform. The first device is a device in which an authentication application is installed and that has a capability of communicating with the mobile communications authentication platform.

102. The mobile communications authentication platform searches for a correspondence between identifier information of devices on the mobile communications authentication platform according to the first identifier information and the second identifier information, determines whether the first identifier information is corresponding to the second identifier information, and feeds back a determining result to the first device.

It should be noted that, the correspondence between identifier information of devices is stored on the mobile communications authentication platform in advance. The mobile communications authentication platform searches for the correspondence between identifier information of devices on the mobile communications authentication platform according to the first identifier information and the second identifier information, determines whether the first identifier information is corresponding to the second identifier information, and feeds back the determining result to the first device.

In this embodiment, a mobile communications authentication platform may determine, according to first identifier information of a first device and second identifier information of a second device, and a correspondence between identifier information of devices on the mobile communications authentication platform, whether the first identifier information is corresponding to the second identifier information, and feeds back a determining result to the first device. Therefore, the mobile communications authentication platform can meet authentication requirements in various different scenarios, and is highly universal, cost-effective, and simple and secure.

In the embodiment shown in FIG. 1, the mobile communications authentication platform obtains the correspondence between identifier information of devices before the mobile communications authentication platform searches for the correspondence between identifier information of devices on the mobile communications authentication platform according to the first identifier information and the second identifier information, and determines whether the first identifier information is corresponding to the second identifier information. The following provides detailed description by using a specific embodiment.

Figure 2:
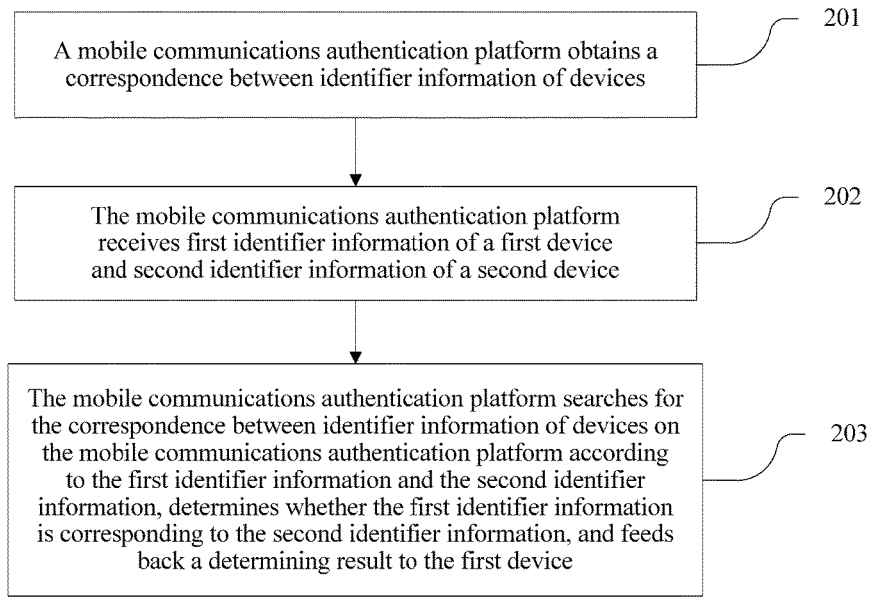
FIG. 2 is a schematic diagram of another embodiment of an authentication method according to an embodiment of the present invention.

Referring to FIG. 2, another embodiment of an authentication method in the embodiments of the present invention includes the following steps.

201. A mobile communications authentication platform obtains a correspondence between identifier information of devices.

That the mobile communications authentication platform obtains the correspondence between identifier information of devices may be as follows: If a correspondence between devices is established, a correspondence between identifier information of the devices is obtained. For example, if a correspondence between a first device and a second device is established, the mobile communications authentication platform may obtain a correspondence between identifier information of the first device and identifier information of the second device.

Establishing the correspondence may be as follows: After buying a device (for example, a vehicle), a user establishes a correspondence between identifier information of a cell phone of the user and identifier information of the device (for example, the vehicle). Obtaining the correspondence between identifier information of devices may be as follows: After learning vehicle frame number information, the user sends the vehicle identifier information (for example, the vehicle frame number information) and a cell phone number of the user to the mobile communications authentication platform. Establishing the correspondence may be as follows: A user establishes a correspondence between a cell phone number of a delivery clerk and a cell phone number of the user when the user is shopping. In this case, obtaining the correspondence between identifier information of devices may be as follows: The mobile communications authentication platform obtains the correspondence from a shopping website, or may receive the correspondence sent from the cell phone of the delivery clerk. This is not specifically limited herein.

It should be noted that, identifier information of a device may be a cell phone number of a user, frame number information of a vehicle that the user has the right to use, and the like. This is not specifically limited herein.

202. The mobile communications authentication platform receives first identifier information of a first device and second identifier information of a second device.

In this embodiment, the mobile communications authentication platform is a mobile communications authentication platform whose identity authentication capability is opened up. A device in which an authentication application is installed can use the identity authentication capability of the mobile communications authentication platform. The first device is a device in which an authentication application is installed and that has a capability of communicating with the mobile communications authentication platform.

The first device may be a vehicle, and the second device may be a mobile terminal (for example, a cell phone); or both the first device and the second device are mobile terminals and the like. This is not limited herein.

It should be noted that, the first identifier information and the second identifier information that are received by the mobile communications authentication platform are sent by the first device. The second identifier information is obtained when the first device meets an authentication occurrence condition. The authentication occurrence condition may be met when a user uses the first device to perform authentication on the second device. For example, when the user wants to use a cell phone (the second device) to open a door of a vehicle (the first device), a cell phone number of the cell phone of the user is obtained by using a sensing apparatus in the vehicle; or the cell phone senses the vehicle and sends the cell phone number to the vehicle.

It may be understood that, when the first identifier information received by the mobile communications authentication platform is sent by the first device, the second identifier information received by the mobile communications authentication platform may be sent by the second device. In this case, the second device also has a capability of communicating with the mobile communications authentication platform, and may also have an authentication application same as that of the first device installed.

203. The mobile communications authentication platform searches for the correspondence between identifier information of devices on the mobile communications authentication platform according to the first identifier information and the second identifier information, determines whether the first identifier information is corresponding to the second identifier information, and feeds back a determining result to the first device.

It should be noted that, the mobile communications authentication platform searches for the correspondence between identifier information of devices on the mobile communications authentication platform according to the first identifier information and the second identifier information, determines whether the first identifier information is corresponding to the second identifier information, and feeds back the determining result to the first device.

After receiving the fed-back determining result, the first device may perform a corresponding response operation. For example, when the first device is a vehicle, the second device is a cell phone of a user, and the fed-back determining result is that the first identifier information is corresponding to the second identifier information, a door of the vehicle is opened. When it is not corresponding, a piece of door opening failure information may be fed back to the cell phone of the user, or no operation is performed.

In this embodiment, a mobile communications authentication platform may determine, according to first identifier information of a first device and second identifier information of a second device, and a correspondence between identifier information of devices on the mobile communications authentication platform, whether the first identifier information is corresponding to the second identifier information, and feeds back a determining result to the first device. Therefore, the mobile communications authentication platform can meet authentication requirements in various different scenarios, and is highly universal, cost-effective, and simple and secure.

In addition, the mobile communications authentication platform obtains the correspondence between identifier information of devices, and may directly use obtained identifier information of devices to perform authentication. Therefore, universality is enhanced.

In the embodiment shown in FIG. 1 or FIG. 2, before the mobile communications authentication platform searches for the correspondence between identifier information of devices on the mobile communications authentication platform according to the first identifier information and the second identifier information, and determines whether the first identifier information is corresponding to the second identifier information, the mobile communications authentication platform further receives authentication application information that is of the first device and sent by the first device. The authentication application information that is of the first device and received by the mobile communications authentication platform may be sent together with the first identifier information, or may be sent individually. This is not limited herein. The mobile communications authentication platform determines an authentication qualification of the first device according to the authentication application information. The following provides detailed description of an embodiment in which the mobile communications authentication platform further receives the authentication application information that is of the first device and sent by the first device.

Figure 3:
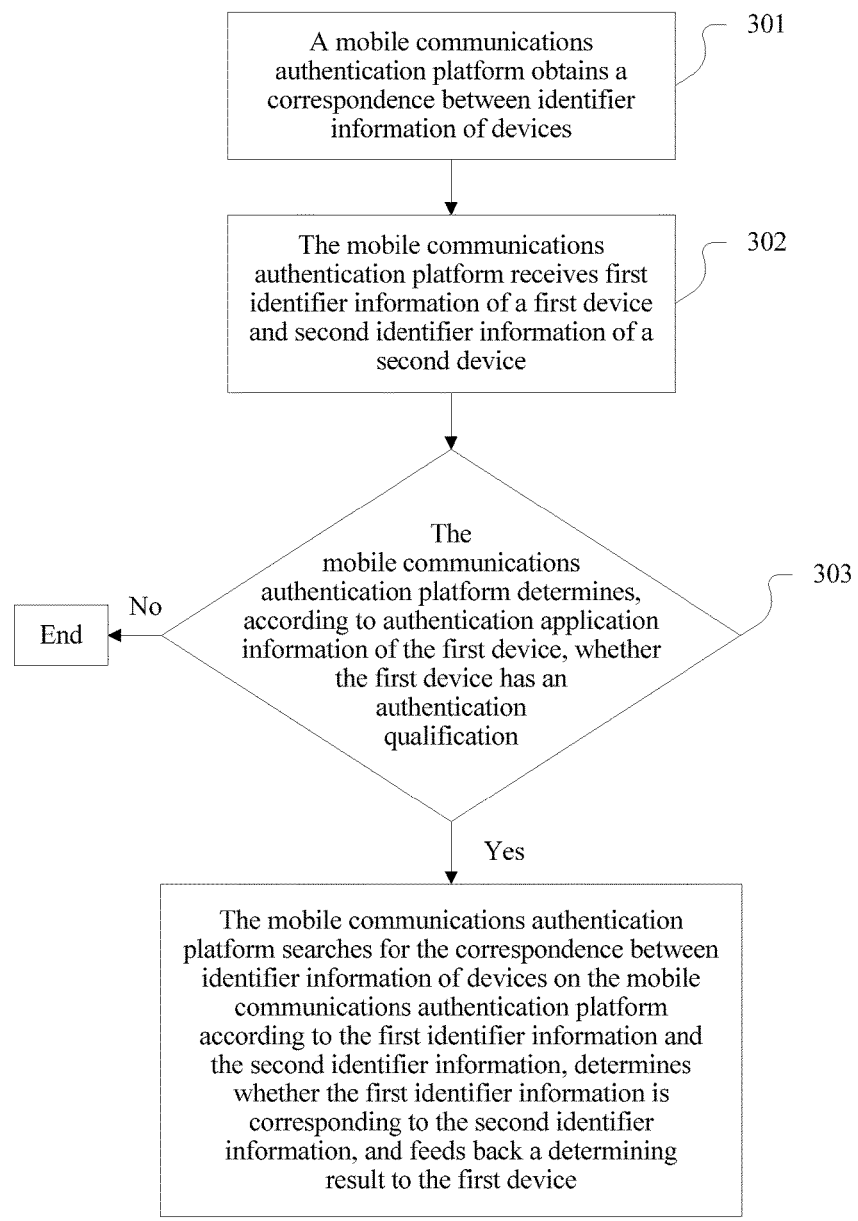
FIG. 3 is a schematic diagram of another embodiment of an authentication method according to an embodiment of the present invention.

Referring to FIG. 3, another embodiment of an authentication method in the embodiments of the present invention includes the following steps.

301. A mobile communications authentication platform obtains a correspondence between identifier information of devices.

In this embodiment, the mobile communications authentication platform is a mobile communications authentication platform whose identity authentication capability is opened up and that stores a valid-authentication application identifier. An authentication application that is developed by using the identity authentication capability opened up by the mobile communications authentication platform registers validity of the application on the mobile communications authentication platform. The mobile communications authentication platform examines a validity registration application of the authentication application. After identifier information of the authentication application is registered on the mobile communications authentication platform, the authentication application is a valid authentication application. A device in which a valid authentication application is installed may have a valid authentication qualification.

That the mobile communications authentication platform obtains the correspondence between identifier information of devices may be as follows: If a correspondence between devices is established, a correspondence between identifier information of the devices is obtained. For example, if a correspondence between a first device and a second device is established, the mobile communications authentication platform may obtain a correspondence between identifier information of the first device and identifier information of the second device.

Establishing the correspondence may be as follows: After buying a device (for example, a vehicle), a user establishes a correspondence between identifier information of a cell phone of the user and identifier information of the device (for example, the vehicle). Obtaining the correspondence between identifier information of devices may be as follows: After learning vehicle frame number information, the user sends the vehicle identifier information (for example, the vehicle frame number information) and a cell phone number of the user to the mobile communications authentication platform. Establishing the correspondence may be as follows: A user establishes a correspondence between a cell phone number of a delivery clerk and a cell phone number of the user when the user is shopping. In this case, obtaining the correspondence between identifier information of devices may be as follows: The mobile communications authentication platform obtains the correspondence from a shopping website, or may receive the correspondence sent from the cell phone of the delivery clerk. This is not specifically limited herein.

It should be noted that, identifier information of a device may be a cell phone number of a user, frame number information of a vehicle that the user has the right to use, and the like. This is not specifically limited herein.

302. The mobile communications authentication platform receives first identifier information of a first device and second identifier information of a second device.

In this embodiment, an authentication application is installed in the first device. The authentication application is corresponding to authentication application information that has an identifying function. The first device is a device that has a capability of communicating with the mobile communications authentication platform.

In this embodiment, the mobile communications authentication platform further receives authentication application information that is of the first device and sent by the first device. The authentication application information that is of the first device and received by the mobile communications authentication platform may be sent together with the first identifier information, or may be sent individually. This is not limited herein.

The first device may be a vehicle, and the second device may be a mobile terminal (for example, a cell phone); or both the first device and the second device are mobile terminals and the like. This is not limited herein.

It should be noted that, the first identifier information and the second identifier information that are received by the mobile communications authentication platform are sent by the first device. The second identifier information is obtained when the first device meets an authentication occurrence condition. For example, when a user wants to use a cell phone (the second device) to open a door of a vehicle (the first device), the cell phone senses the vehicle by using sensing apparatuses in the cell phone and the vehicle, and sends cell phone number information to the vehicle.

It may be understood that, when the first identifier information received by the mobile communications authentication platform is sent by the first device, the second identifier information received by the mobile communications authentication platform may be sent by the second device. In this case, an authentication application is also installed in the second device. The authentication application is corresponding to authentication application information that has an identifying function. The second device also has a capability of communicating with the mobile communications authentication platform.

303. The mobile communications authentication platform determines, according to authentication application information of the first device, whether the first device has an authentication qualification; and if yes, performs step 304; or if no, ends the procedure.

The mobile communications authentication platform may compare the authentication application information of the first device with valid application identifier information supported by the mobile communications authentication platform, to determine whether the authentication application information of the first device is valid application identifier information supported by the mobile communications authentication platform. If yes, the first device has an authentication qualification, and step 304 is performed; or if no, the procedure may be ended, or invalid application prompt information may be returned. This is not limited herein.

304. The mobile communications authentication platform searches for the correspondence between identifier information of devices on the mobile communications authentication platform according to the first identifier information and the second identifier information, determines whether the first identifier information is corresponding to the second identifier information, and feeds back a determining result to the first device.

It should be noted that, the mobile communications authentication platform searches for the correspondence between identifier information of devices on the mobile communications authentication platform according to the first identifier information and the second identifier information, determines whether the first identifier information is corresponding to the second identifier information, and feeds back the determining result to the first device.

After receiving the fed-back determining result, the first device may perform a corresponding response operation. For example, when the first device is a vehicle, the second device is a cell phone of a user, and the fed-back determining result is that the first identifier information is corresponding to the second identifier information, a door of the vehicle is opened. When it is not corresponding, a piece of door opening failure information may be fed back to the cell phone of the user, or no operation is performed.

In this embodiment, a mobile communications authentication platform may determine, according to first identifier information of a first device and second identifier information of a second device, and a correspondence between identifier information of devices on the mobile communications authentication platform, whether the first identifier information is corresponding to the second identifier information, and feeds back a determining result to the first device. Therefore, the mobile communications authentication platform can meet authentication requirements in various different scenarios, and is highly universal, cost-effective, and simple and secure.

In addition, before the mobile communications authentication platform determines, according to the first identifier information of the first device and the second identifier information of the second device, and the correspondence between identifier information of devices on the mobile communications authentication platform, whether the first identifier information is corresponding to the second identifier information, the mobile communications authentication platform determines the authentication qualification of the first device. This improves security and limits an invalid authentication request.

Figure 4:
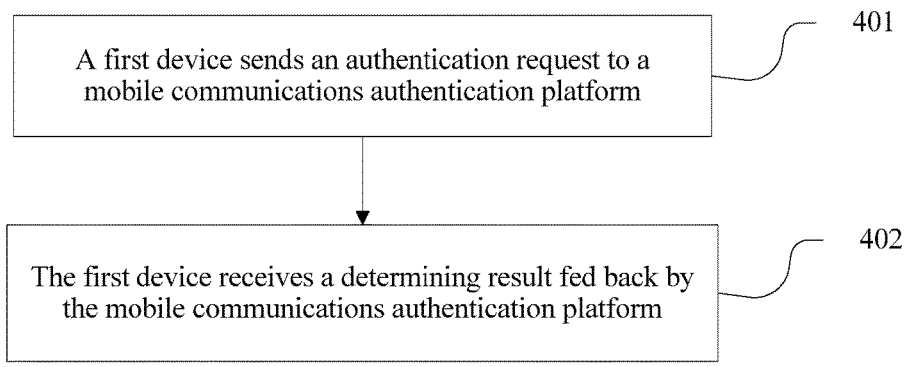
FIG. 4 is a schematic diagram of another embodiment of an authentication method according to an embodiment of the present invention.

The following describes the authentication method from another side. Referring to FIG. 4, another embodiment of a communications method in the embodiments of the present invention includes the following steps.

401. A first device sends an authentication request to a mobile communications authentication platform.

In this embodiment, the mobile communications authentication platform is a mobile communications authentication platform whose identity authentication capability is opened up. A device in which a valid authentication application is installed can use the identity authentication capability of the mobile communications authentication platform. The first device is a device in which an authentication application is installed and that has a capability of communicating with the mobile communications authentication platform.

The authentication request may include first identifier information of the first device and second identifier information of a second device. Before sending the authentication request to the mobile communications authentication platform, the first device first obtains the second identifier information of the second device. The second device may send the second identifier information of the second device to the first device, or the second device may actively obtain the second identifier information of the second device. This is not limited herein.

In practical application, the authentication request may also include only the first identifier information of the first device. In this case, the second device sends the second identifier information of the second device to the mobile communications authentication platform.

402. The first device receives a determining result fed back by the mobile communications authentication platform.

After the first device sends the authentication request to the mobile communications authentication platform, the mobile communications authentication platform obtains the first identifier information of the first device and the second identifier information of the second device. The mobile communications authentication platform searches for a correspondence between identifier information of devices on the mobile communications authentication platform according to the first identifier information and the second identifier information, determines whether the first identifier information is corresponding to the second identifier information, and feeds back a determining result to the first device.

That is, the determining result is obtained after the mobile communications authentication platform searches for the correspondence between identifier information of devices on the mobile communications authentication platform according to the first identifier information and the second identifier information, and determines whether the first identifier information is corresponding to the second identifier information.

In this embodiment, a first device sends an authentication request to a mobile communications authentication platform. The authentication request may include first identifier information of the first device, or first identifier information of the first device and second identifier information of a second device, so that the mobile communications authentication platform determines, according to a correspondence between identifier information of devices on the mobile communications authentication platform, whether the first identifier information is corresponding to the second identifier information, and feeds back a determining result to the first device. Therefore, the mobile communications authentication platform can meet authentication requirements in various different scenarios, and is highly universal, cost-effective, and simple and secure.

In the embodiment shown in FIG. 4, the first device may further send authentication application information of the first device to the mobile communications authentication platform. A manner of sending the authentication application information of the first device may be as follows: The authentication request further includes the authentication application information of the first device, so that the mobile communications authentication platform determines an authentication qualification of the first device. Alternatively, the manner may be as follows: The first device individually sends the authentication application information of the first device to the mobile communications authentication platform. This is not limited herein.

Figure 5:
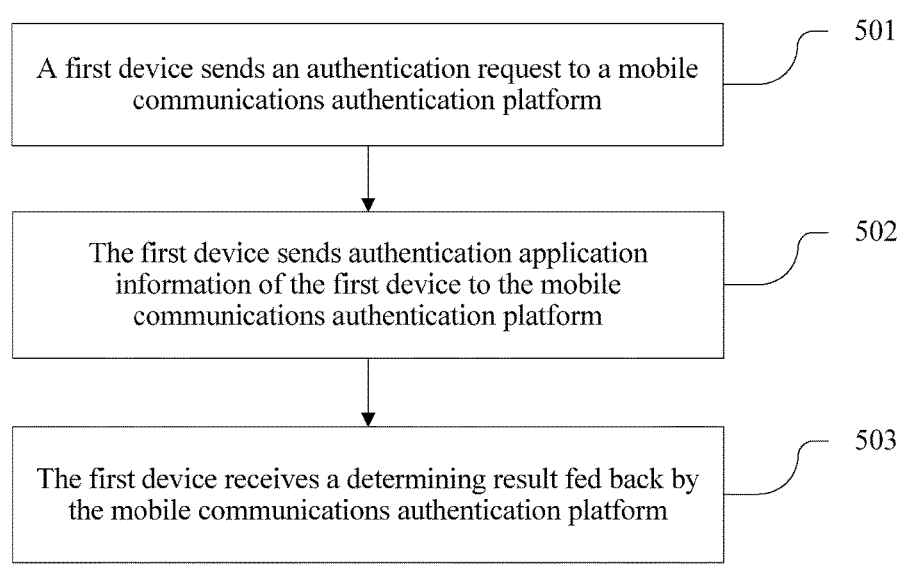
FIG. 5 is a schematic diagram of another embodiment of an authentication method according to an embodiment of the present invention.

The following provides detailed description by using an example that the first device individually sends the authentication application information of the first device to the mobile communications authentication platform. Referring to FIG. 5, another embodiment of an authentication method in the embodiments of the present invention includes the following steps.

501. A first device sends an authentication request to a mobile communications authentication platform.

In this embodiment, the mobile communications authentication platform is a mobile communications authentication platform whose identity authentication capability is opened up and that stores a valid-authentication application identifier. An authentication application that is developed by using the identity authentication capability opened up by the mobile communications authentication platform registers validity of the application on the mobile communications authentication platform. The mobile communications authentication platform examines a validity registration application of the authentication application. After identifier information of the authentication application is registered on the mobile communications authentication platform, the authentication application is a valid authentication application. A device in which a valid authentication application is installed may have a valid authentication qualification. An authentication application is installed in the first device. The authentication application is corresponding to authentication application information that has an identifying function. The first device is a device that has a capability of communicating with the mobile communications authentication platform.

The authentication request may include first identifier information of the first device and second identifier information of a second device. Before sending the authentication request to the mobile communications authentication platform, the first device first obtains the second identifier information of the second device. The second device may send the second identifier information of the second device to the first device, or the second device may actively obtain the second identifier information of the second device. This is not limited herein.

In practical application, the authentication request may also include only the first identifier information of the first device. In this case, the second device sends the second identifier information of the second device to the mobile communications authentication platform.

502. The first device sends authentication application information of the first device to the mobile communications authentication platform.

The first device sends the authentication application information of the first device to the mobile communications authentication platform, so that the mobile communications authentication platform determines an authentication qualification of the first device. The mobile communications authentication platform may compare the authentication application information with valid-application identifier information supported by the mobile communications authentication platform, to determine whether the authentication application information is valid-application identifier information supported by the mobile communications authentication platform. If yes, the first device has an authentication qualification. When the first device has an authentication qualification, the mobile communications authentication platform searches for a correspondence between identifier information of devices on the mobile communications authentication platform according to the first identifier information and the second identifier information, determines whether the first identifier information is corresponding to the second identifier information, and feeds back a determining result to the first device.

503. The first device receives a determining result fed back by the mobile communications authentication platform.

After the first device sends the authentication request to the mobile communications authentication platform, the mobile communications authentication platform obtains the first identifier information of the first device and the second identifier information of the second device. The mobile communications authentication platform searches for the correspondence between identifier information of devices on the mobile communications authentication platform according to the first identifier information and the second identifier information, determines whether the first identifier information is corresponding to the second identifier information, and feeds back a determining result to the first device.

That is, the determining result is obtained after the mobile communications authentication platform searches for the correspondence between identifier information of devices on the mobile communications authentication platform according to the first identifier information and the second identifier information, and determines whether the first identifier information is corresponding to the second identifier information.

In this embodiment, a first device sends an authentication request to a mobile communications authentication platform. The authentication request may include first identifier information of the first device, or first identifier information of the first device and second identifier information of a second device, so that the mobile communications authentication platform determines, according to a correspondence between identifier information of devices on the mobile communications authentication platform, whether the first identifier information is corresponding to the second identifier information, and feeds back a determining result to the first device. Therefore, the mobile communications authentication platform can meet authentication requirements in various different scenarios, and is highly universal, cost-effective, and simple and secure.

In addition, the first device further sends the authentication application information of the first device to the mobile communications authentication platform, so that the mobile communications authentication platform determines the authentication qualification of the first device. This improves security and limits an invalid authentication request.

Figure 6:
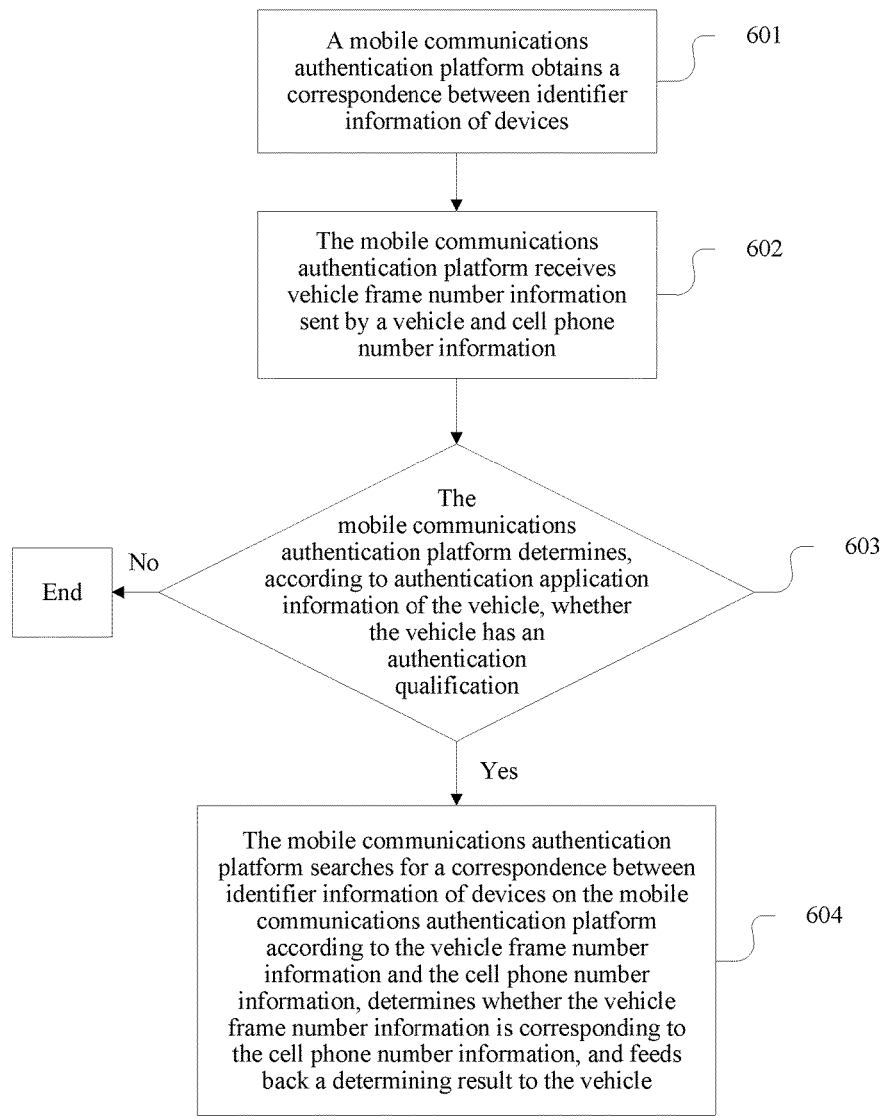
FIG. 6 is a schematic diagram of another embodiment of an authentication method according to an embodiment of the present invention.

For ease of understanding, the authentication method described in the foregoing embodiments is described in detail by using an example that a first device is a vehicle and a second device is a cell phone with reference to a specific application scenario. Referring to FIG. 6, another embodiment of an authentication method in the embodiments of the present invention includes the following steps.

601. A mobile communications authentication platform obtains a correspondence between identifier information of devices.

That the mobile communications authentication platform obtains the correspondence between identifier information of devices may be as follows: If a correspondence between devices is established, a correspondence between identifier information of the devices is obtained. For example, when a correspondence between the vehicle and the cell phone is established, the mobile communications authentication platform can obtain a correspondence between identifier information of the first device and identifier information of the second device.

Establishing the correspondence may be as follows: After buying a vehicle, a user establishes a correspondence between identifier information of a cell phone of the user and identifier information of the vehicle. Obtaining the correspondence between identifier information of devices may be as follows: After learning vehicle frame number information, the user sends the vehicle frame number information and a cell phone number of the user to the mobile communications authentication platform. Then, a correspondence between the vehicle frame number information and cell phone number information of the user is established on the mobile communications authentication platform.

In this embodiment, the first device is the vehicle of the user, and the second device is the cell phone of the user. It should be noted that merely an example that the first device and the second device are respectively the vehicle and the cell phone is used in this embodiment. In practical application, the first device and the second device may be other devices, mobile terminals, or the like. This is not specifically limited.

It should be noted that, an example that the identifier information of the vehicle is vehicle frame number information and the identifier information of the cell phone is the cell phone number is used for description in this embodiment. This is not specifically limited herein.

602. The mobile communications authentication platform receives vehicle frame number information sent by a vehicle and cell phone number information.

In this embodiment, the mobile communications authentication platform is a mobile communications authentication platform whose identity authentication capability is opened up and that stores a valid-authentication application identifier. A device in which a valid authentication application is installed may have a valid authentication qualification.

An authentication application that can communicate with the mobile communications authentication platform is installed in both the vehicle and the cell phone. In this embodiment, the mobile communications authentication platform further receives authentication application information that is of the vehicle and sent by the vehicle. The authentication application information that is of the vehicle and received by the mobile communications authentication platform may be sent together with the vehicle frame number information, or may be sent individually. This is not limited herein.

It should be noted that, the vehicle frame number information and the cell phone number information of the cell phone of the user that are received by the mobile communications authentication platform are sent by the first device. The cell phone number information of the cell phone of the user is obtained when the vehicle meets an authentication occurrence condition. For example, when the user wants to use the cell phone (the second device) to open a door of the vehicle (the first device), the cell phone senses the vehicle by using sensing apparatuses in the vehicle and the cell phone, and sends the cell phone number information to the vehicle.

It may be understood that when the vehicle frame number information received by the mobile communications authentication platform is sent by the vehicle, the cell phone number information of the user received by the mobile communications authentication platform may be sent by the cell phone.

603. The mobile communications authentication platform determines, according to authentication application information of the vehicle, whether the vehicle has an authentication qualification; and if yes, performs step 604; or if no, ends the procedure.

The mobile communications authentication platform may compare the authentication application information of the vehicle with valid-application identifier information supported by the mobile communications authentication platform, to determine whether the authentication application information of the vehicle is valid-application identifier information supported by the mobile communications authentication platform. If yes, the vehicle has an authentication qualification, and step 604 is performed; or if no, the procedure may be ended, or invalid-application prompt information may be returned. This is not limited herein.

604. The mobile communications authentication platform searches for a correspondence between identifier information of devices on the mobile communications authentication platform according to the vehicle frame number information and the cell phone number information, determines whether the vehicle frame number information is corresponding to the cell phone number information, and feeds back a determining result to the vehicle.

It should be noted that, the mobile communications authentication platform searches for the correspondence between identifier information of devices on the mobile communications authentication platform according to the vehicle frame number information and the cell phone number information, determines whether the vehicle frame number information is corresponding to the cell phone number information, and feeds back the determining result to the vehicle.

After receiving the fed-back determining result, the vehicle may perform a corresponding response operation. For example, when the fed-back determining result is that the vehicle frame number information is corresponding to the cell phone number information of the user, the door of the vehicle is opened. When the vehicle frame number information is not corresponding to the cell phone number information of the user, a piece of door opening failure information may be fed back to the cell phone of the user, or no operation is performed.

Figure 7:
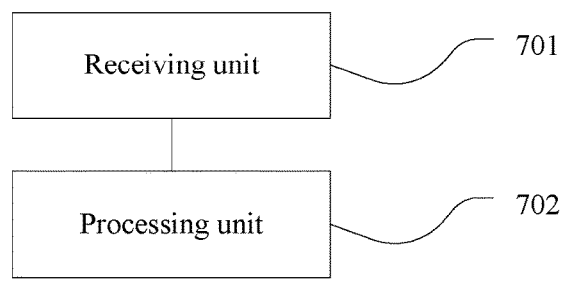
FIG. 7 is a schematic diagram of an embodiment of a mobile communications authentication platform according to an embodiment of the present invention.

The following describes an embodiment of a mobile communications authentication platform in the embodiments of the present invention. Referring to FIG. 7, an embodiment of the mobile communications authentication platform in the embodiments of the present invention includes: a receiving unit 701, configured to receive first identifier information of a first device and second identifier information of a second device; and a processing unit 702, configured to search for a correspondence between identifier information of devices on the mobile communications authentication platform according to the first identifier information and the second identifier information, determine whether the first identifier information is corresponding to the second identifier information, and feed back a determining result to the first device.

The processing unit 702 is further configured to obtain the correspondence between identifier information of devices before the authentication unit searches for the correspondence between identifier information of devices on the mobile communications authentication platform according to the first identifier information and the second identifier information, and determines whether the first identifier information is corresponding to the second identifier information.

The first identifier information and the second identifier information that are received by the receiving unit 701 may be sent by the first device.

The first identifier information received by the receiving unit 701 may be sent by the first device, and the second identifier information received by the receiving unit may be sent by the second device.

The receiving unit 701 may be further configured to receive authentication application information that is of the first device and sent by the first device; and the processing unit 702 may be further configured to determine an authentication qualification of the first device according to the authentication application information of the first device.

The processing unit 702 is specifically configured to determine, according to the authentication application information, that an authentication application of the first device is a valid application.

In this embodiment, a receiving unit 701 receives first identifier information and second identifier information of a second device. A processing unit 702 determines, according to a correspondence between identifier information of devices on a mobile communications authentication platform, whether the first identifier information is corresponding to the second identifier information, and feeds back a determining result to a first device. Therefore, the mobile communications authentication platform can meet authentication requirements in various different scenarios, and is highly universal, cost-effective, and simple and secure.

For ease of understanding, the following uses a specific application scenario as an example to describe an internal operating procedure of the mobile communications authentication platform in this embodiment.

The receiving unit 701 receives the first identifier information of the first device and the second identifier information of the second device; and the processing unit 702 searches for the correspondence between identifier information of devices on the mobile communications authentication platform according to the first identifier information and the second identifier information, determines whether the first identifier information is corresponding to the second identifier information, and feeds back the determining result to the first device.

The processing unit 702 may further obtain the correspondence between identifier information of devices before the authentication unit searches for the correspondence between identifier information of devices on the mobile communications authentication platform according to the first identifier information and the second identifier information, and determines whether the first identifier information is corresponding to the second identifier information.

The first identifier information and the second identifier information that are received by the receiving unit 701 may be sent by the first device.

The first identifier information received by the receiving unit 701 may be sent by the first device, and the second identifier information received by the receiving unit may be sent by the second device.

The receiving unit 701 may further receive the authentication application information that is of the first device and sent by the first device; and the processing unit 702 may determine the authentication qualification of the first device according to the authentication application information of the first device.

The processing unit 702 may determine, according to the authentication application information, that the authentication application of the first device is a valid application.

In this embodiment, the receiving unit 701 may be specifically a receiver, and the processing unit 702 may be a processor (one or more). This is not limited herein.

Figure 8:
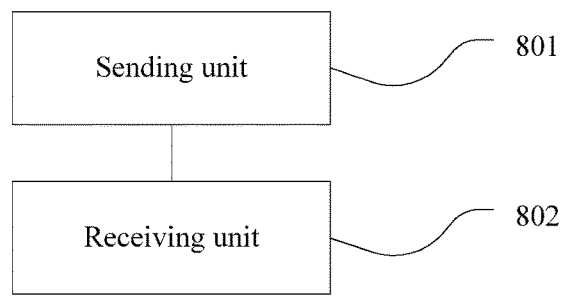
FIG. 8 is a schematic diagram of an embodiment of a device according to an embodiment of the present invention.

The following describes an embodiment of a first device in the embodiments of the present invention. Referring to FIG. 8, an embodiment of a device in the embodiments of the present invention includes: a sending unit 801, configured to send an authentication request to a mobile communications authentication platform; and a receiving unit 802, configured to: when the authentication request includes first identifier information of the device and second identifier information of a target device, receive a determining result fed back by the mobile communications authentication platform, where the determining result is obtained after the mobile communications authentication platform searches for a correspondence between identifier information of devices on the mobile communications authentication platform according to the first identifier information and the second identifier information, and determines whether the first identifier information is corresponding to the second identifier information.

The receiving unit 802 is further configured to: when the authentication request includes the first identifier information of the first device, receive the determining result fed back by the mobile communications authentication platform, where the determining result is obtained after the mobile communications authentication platform searches for the correspondence between identifier information of devices on the mobile communications authentication platform according to the first identifier information and the received second identifier information of the target device, and determines whether the first identifier information is corresponding to the second identifier information.

The sending unit 801 may be further configured to send authentication application information of the first device to the mobile communications authentication platform, so that the mobile communications authentication platform determines an authentication qualification of the first device.

In this embodiment, the receiving unit 802 may be specifically a receiver, and the sending unit 801 may be a transmitter. This is not limited herein.

In this embodiment, a sending unit 801 sends an authentication request to a mobile communications authentication platform, where the authentication request may include first identifier information of a first device, or first identifier information of a first device and second identifier information of a second device, so that the mobile communications authentication platform determines, according to a correspondence between identifier information of devices on the mobile communications authentication platform, whether the first identifier information is corresponding to the second identifier information, and feeds back a determining result to the first device. Therefore, the mobile communications authentication platform can meet authentication requirements in various different scenarios, and is highly universal, cost-effective, and simple and secure.

Figure 9:
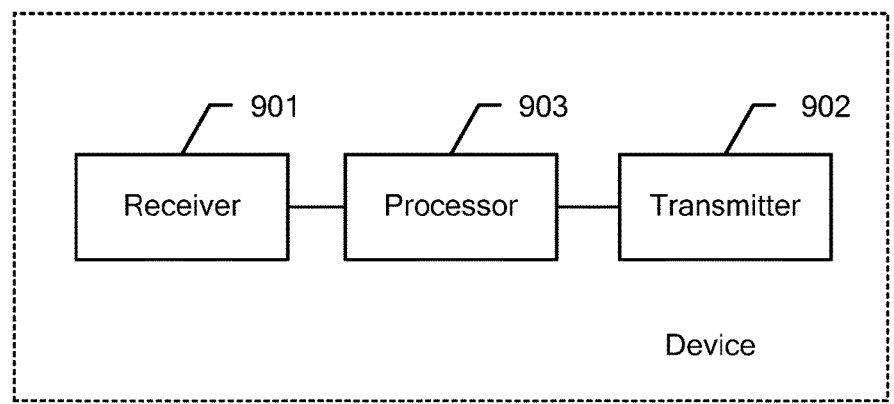
FIG. 9 is a schematic diagram of another embodiment of a mobile communications authentication platform according to an embodiment of the present invention.

The following describes a mobile communications authentication platform provided in the embodiments of the present invention from a hardware perspective with reference to the embodiment of FIG. 3. Referring to FIG. 9, the mobile communications authentication platform includes a receiver 901, a transmitter 902, and a processor 903 (may be one or more).

The first device related in this embodiment of the present invention may have more or fewer parts than those shown in FIG. 9, may combine two or more parts, or may have different part configurations or settings. Parts may be implemented in hardware including one or more signal processing and/or application-specific integrated circuits, in software, or in a combination of hardware and software.

The receiver 901 is configured to perform the following operation: obtaining a correspondence between identifier information of devices when a correspondence is established between the devices.

The receiver 901 is further configured to perform the following operation: receiving first identifier information of a first device, second identifier information of a second device, and authentication application information of the first device.

The processor 903 determines, according to the authentication application information, whether the first device has an authentication qualification. If yes, the processor 903 searches for a correspondence between identifier information of devices on the mobile communications authentication platform according to the first identifier information and the second identifier information, and determines whether the first identifier information is corresponding to the second identifier information; or if no, ends the procedure.

The transmitter 902 feeds back a determining result to the first device according to a result, whether the first identifier information is corresponding to the second identifier information, that is determined by the processor 903.

The foregoing describes merely an embodiment of the mobile communications authentication platform provided in the embodiments of the present invention with reference to the method embodiment in FIG. 3. For another embodiment of the mobile communications authentication platform provided in the present invention, reference may be made to this embodiment. For specific implementation operations of the mobile communications authentication platform, reference may be made to methods executed by the mobile communications authentication platform in the foregoing method embodiments. This is not specifically described herein.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments. In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A method, comprising:
    establishing, by a mobile communications authentication platform, a first correspondence between a first device and a second device in response to data received from the first device;
    adding the first correspondence to a plurality of correspondences between identifier information of devices on the mobile communications authentication platform;
    receiving, by the mobile communications authentication platform, first identifier information of the first device and second identifier information of the second device;
    receiving, by the mobile communications authentication platform from the first device, authentication application information of the first device;
    comparing, by the mobile communications authentication platform, the authentication application information of the first device with valid application identifier information supported by the mobile communications authentication platform to determine whether the authentication application information of the first device is the valid application identifier information supported by the mobile communications authentication platform;
    based on determination that the authentication application information of the first device is the valid application identifier information supported by the mobile communications authentication platform, searching, by the mobile communications authentication platform, the plurality of correspondences between the identifier information of devices according to the first identifier information and the second identifier information;
    determining, based on the searching, whether the first identifier information corresponds to the second identifier information; and
    feeding back, to the first device, a determining result indicating whether the first identifier information corresponds to the second identifier information.

2. The method according to claim 1, further comprising:
    obtaining, by the mobile communications authentication platform, the plurality of correspondences between the identifier information of devices.

3. The method according to claim 1, wherein receiving the first identifier information and the second identifier information comprises:
    receiving, by the mobile communications authentication platform, the first identifier information from the first device; and
    receiving, by the mobile communications authentication platform, the second identifier information from the first device.

4. The method according to claim 1, wherein receiving the first identifier information and the second identifier information comprises:
    receiving, by the mobile communications authentication platform, the first identifier information from the first device; and
    receiving, by the mobile communications authentication platform, the second identifier information from the second device.

5. The method according to claim 1, the determining whether the first identifier information corresponds to the second identifier information further comprising:

determining, by the mobile communications authentication platform, an authentication qualification of the first device according to the authentication application information of the first device.

6. The method according to claim 5, wherein determining, by the mobile communications authentication platform, the authentication qualification of the first device according to the authentication application information of the first device comprises:
 determining, by the mobile communications authentication platform according to the authentication application information, that an authentication application of the first device is a valid application.

7. The method according to claim 1, wherein:
 the first device is a first mobile terminal of a first user; and
 the second device is a second mobile terminal of a second user.

8. The method claim 1, wherein the authentication application information is associated with an authentication application installed on the first device for communicating with the mobile communications authentication platform and using identity authentication capability of the mobile communications authentication platform to authenticate the first identifier information and the second identifier information, and wherein the second identifier information of the second device is obtained by the first device after the first device meets an authentication occurrence condition.

9. A method, comprising:
 sending, by a first device to a mobile communications authentication platform, first information of the first device and second information of a second device, causing the mobile communications authentication platform to establish a first correspondence between the first device and the second device according to the first information of the first device and the second information of the second device, and further causing the mobile communications authentication platform to add the first correspondence to a plurality of correspondences between identifier information of devices on the mobile communications authentication platform;
 sending, by the first device, authentication application information of the first device to the mobile communications authentication platform for the mobile communications authentication platform to compare the authentication application information of the first device with valid application identifier information supported by the mobile communications authentication platform to determine whether the authentication application information of the first device is the valid application identifier information supported by the mobile communications authentication platform;
 sending, by the first device, an authentication request to the mobile communications authentication platform, wherein the authentication request comprises first identifier information of the first device; and
 receiving, by the first device from the mobile communications authentication platform, a determining result indicating whether the first identifier information corresponds to second identifier information of the second device, wherein the determining result is obtained after the mobile communications authentication platform searches the plurality of correspondences between the identifier information of devices according to the first identifier information and the second identifier information and based on the authentication application information.

10. The method according to claim 9,
 the sending the authentication application information causing the mobile communications authentication platform to determine an authentication qualification of the first device.

11. The method according to claim 9, wherein the authentication request further comprises the second identifier information of the second device.

12. The method according to claim 10,
 wherein an authentication application installed on the first device is a same authentication application installed on the second device having a second authentication qualification.

13. A mobile communications authentication platform, comprising:
 a receiver, configured to:
  receive authentication application information of a first device; and
  receive first identifier information of the first device and second identifier information of a second device;
 a processor; and
 a non-transitory computer-readable storage medium storing a program to be executed by the processor, the program including instructions for:
  establishing a first correspondence between the first device and the second device in response to data received from the first device;
  adding the first correspondence to a plurality of correspondences between identifier information of devices;
  compare the authentication application information of the first device with valid application identifier information supported by the mobile communications authentication platform to determine whether the authentication application information of the first device is the valid application identifier information supported by the mobile communications authentication platform;
  based on determination that the authentication application information of the first device is the valid application identifier information supported by the mobile communications authentication platform, searching the plurality of correspondences between the identifier information of devices according to the first identifier information and the second identifier information;
  determining whether the first identifier information corresponds to the second identifier information based on the searching; and
  feeding back, to the first device, a determining result indicating whether the first identifier information corresponds to the second identifier information.

14. The mobile communications authentication platform according to claim 13, wherein the program further includes instructions for:
 obtaining the plurality of correspondences between the identifier information of devices before searching the plurality of correspondences between the identifier information of devices.

15. The mobile communications authentication platform according to claim 13, wherein the receiver is further configured to:
 receive the first identifier information from the first device; and
 receive the second identifier information from the first device.

16. The mobile communications authentication platform according to claim 13, wherein the receiver is further configured to:
  receive the first identifier information from the first device; and
  receive the second identifier information from the second device.

17. The mobile communications authentication platform according to claim 13, wherein
  the determining whether the first identifier information corresponds to the second identifier information comprises determining an authentication qualification of the first device according to the authentication application information of the first device.

18. The mobile communications authentication platform according to claim 17, wherein the program further includes instructions for:
  determining, according to the authentication application information, that an authentication application of the first device is a valid application.

19. A device, comprising:
  a transmitter, configured to:
    send, to a mobile communications authentication platform, first information of the device and second information of a second device, causing the mobile communications authentication platform to establish a first correspondence between the device and the second device according to the first information of the device and the second information of the second device, and further causing the mobile communications authentication platform to add the first correspondence to a plurality of correspondences between identifier information of devices on the mobile communications authentication platform;
    send authentication application information of the device to the mobile communications authentication platform for the mobile communications authentication platform to compare the authentication application information of the device with valid application identifier information supported by the mobile communications authentication platform to determine whether the authentication application information of the device is the valid application identifier information supported by the mobile communications authentication platform; and
    send an authentication request to the mobile communications authentication platform, wherein the authentication request comprises first identifier information of the device; and
  a receiver, configured to receive, from the mobile communications authentication platform, a determining result indicating whether the first identifier information corresponds to second identifier information of the second device, wherein the determining result is obtained after the mobile communications authentication platform searches the plurality of correspondences between the identifier information of devices according to the first identifier information and the second identifier information and based on the authentication application information.

20. The device according to claim 19,
  sending of the authentication application information causing the mobile communications authentication platform to determine an authentication qualification of the device.

21. The device according to claim 20,
  wherein an authentication application installed on the device is a same authentication application installed on the second device having a second authentication qualification.

* * * * *